United States Patent
Kircher et al.

(10) Patent No.: US 7,852,068 B2
(45) Date of Patent: *Dec. 14, 2010

(54) INSERTION PART FOR A SEAT BELT LOCK, A LOCK PROVIDED WITH SAID INSERTION PART

(75) Inventors: Martin Kircher, Bad Ragaz (CH); Henry-J. Schulze, Domat/Ems (CH)

(73) Assignee: Polycontact AG, Chur (CH)

( * ) Notice: Subject to any disclaimer, the term of this patent is extended or adjusted under 35 U.S.C. 154(b) by 483 days.

This patent is subject to a terminal disclaimer.

(21) Appl. No.: 11/883,796

(22) PCT Filed: Aug. 30, 2005

(86) PCT No.: PCT/CH2005/000511

§ 371 (c)(1),
(2), (4) Date: Aug. 7, 2007

(87) PCT Pub. No.: WO2006/084394

PCT Pub. Date: Aug. 17, 2006

(65) Prior Publication Data

US 2008/0116678 A1    May 22, 2008

(30) Foreign Application Priority Data

Feb. 8, 2005  (CH) ..................... 191/05
Mar. 1, 2005  (CH) ..................... 354/05
Apr. 22, 2005 (CH) ..................... 719/05

(51) Int. Cl.
G01B 7/14   (2006.01)
G01R 33/07  (2006.01)
H01L 43/06  (2006.01)
B60R 21/00  (2006.01)

(52) U.S. Cl. ............... 324/207.24; 324/207.2; 180/268

(58) Field of Classification Search ............ 324/207.11, 324/207.13, 207.2, 207.21, 207.22, 207.23, 324/207.24, 207.26; 24/303, 603, 633, 645; 280/735; 180/268; 200/61.58 B
See application file for complete search history.

(56) References Cited

U.S. PATENT DOCUMENTS 5,241,267 A    8/1993   Gleixner et al.
(Continued)

FOREIGN PATENT DOCUMENTS

DE    197 51 519 A1    5/1999
(Continued)

OTHER PUBLICATIONS

International Preliminary Report on Patentability and attached Written Opinion (Forms PCT/IB/338 and PCT/ISA/237), issued in corresponding PCT/CH2005/000511, mailed Nov. 22, 2007.
(Continued)

*Primary Examiner*—Kenneth J Whittington
(74) *Attorney, Agent, or Firm*—Buchanan Ingersoll & Rooney PC (57) ABSTRACT

A switch adapter is integrateable into a seat belt lock and used for monitoring the locking and unlocking state of the lock. The switch adapter includes a monolithic plastic part and is at least two adapter areas which are movable with respect to each other. The first adapter area carries a first switch element and the second adapter area carries a second switch element. The switch adapter is suitably integrateable into the lock of the seat belt which is provided with a frame and a locking element which is movably mounted so as to switch the seat belt buckle between a locking position and an unlocking position. The switch adapter is used for detecting the locking state of the seat belt locking element. For this purpose, the switch adapter and the locking element are actively connectable to each in such a way that the switching state of the switching adapter and the position of the locking element are modifiable only simultaneously.

30 Claims, 11 Drawing Sheets

U.S. PATENT DOCUMENTS

| | | | |
|---|---|---|---|
| 5,359,286 A * | 10/1994 | Kaiser et al. | 324/207.2 |
| 5,898,366 A * | 4/1999 | Brown et al. | 340/457.1 |
| 5,960,523 A | 10/1999 | Husby et al. | |
| 6,357,091 B1 | 3/2002 | Devereaux | |
| 6,389,661 B1 | 5/2002 | Brown et al. | |
| 6,611,140 B1 * | 8/2003 | Bloechl et al. | 324/207.21 |
| 7,586,301 B2 * | 9/2009 | Lanter et al. | 324/207.2 |
| 2002/0005715 A1 | 1/2002 | Sato | |
| 2002/0166216 A1 * | 11/2002 | Jain et al. | 24/633 |
| 2003/0030431 A1 | 2/2003 | Reininger | |
| 2004/0080491 A1 * | 4/2004 | Takatsuka et al. | 345/156 |
| 2007/0273365 A1 | 11/2007 | Lanter et al. | |
| 2008/0116678 A1 | 5/2008 | Kirchner et al. | |

FOREIGN PATENT DOCUMENTS

| | | |
|---|---|---|
| DE | 102 18 522 C1 | 10/2003 |
| DE | 103 03 363 A1 | 8/2004 |
| EP | 0 861 763 A | 9/1998 |
| GB | 2 326 978 A | 1/1999 |

OTHER PUBLICATIONS

International Search Report for PCT/CH2005/000511, dated Nov. 24, 2005.

International Search Report issued in PCT/CH2005/000512 mailed Nov. 24, 2005.

Lanter et al., Copending U.S. Appl. No. 11/661,291 filed Feb. 27, 2007 entitled "Hall Sensor Arrangement and Use of a Hall Sensor Arrangement in a Belt Lock".

* cited by examiner

INSERTION PART FOR A SEAT BELT LOCK, A LOCK PROVIDED WITH SAID INSERTION PART

The invention relates to a mounting part for mounting in the belt lock of a safety belt, as well as a belt lock with such a mounting part, especially a belt lock for the safety belt in a motor vehicle.

Figure 1:
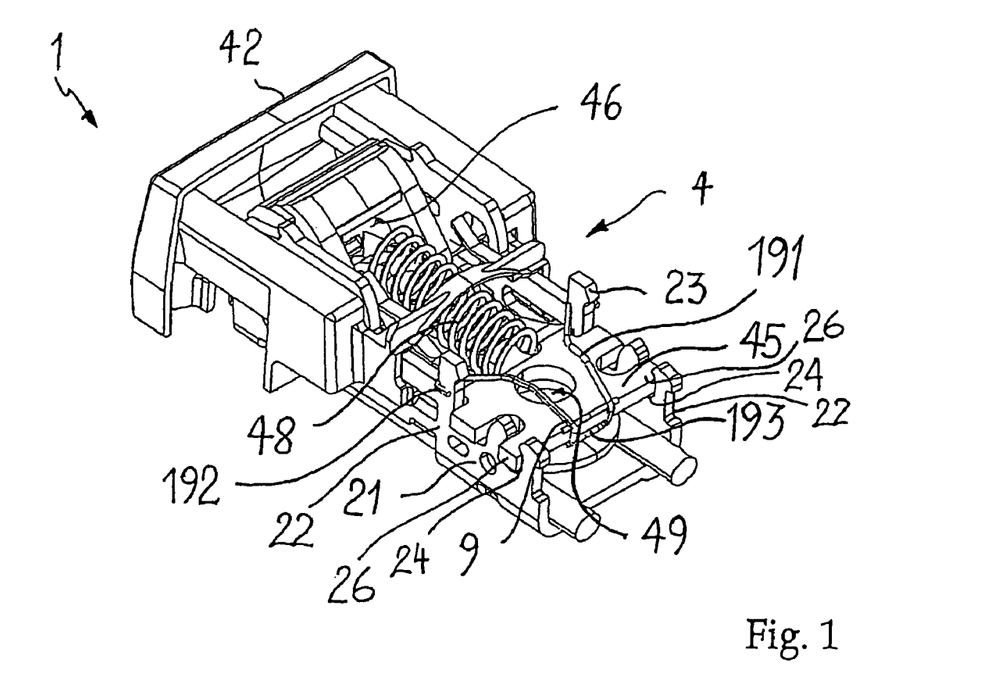
FIG. 1 shows a perspective of a belt lock known from the prior art without the surrounding housing.

A known belt lock is shown in FIG. 1 without the surrounding housing. The belt lock is labelled with reference number 1. The belt lock 1 has a frame 21. A locking mechanism 4 is held in the frame 21. The locking mechanism 4 comprises a rocker 45 and an ejector 46 which is pretensioned by a compression spring 48 in the direction of the insertion slot. The rocker 45 is used as a locking body with which the locking tongue of a belt buckle which has been inserted into the belt lock is locked in the lock.

An unlocking button for unlocking a belt buckle (not shown) which has been locked in the lock is labelled 42. The frame 21 has parallel side walls 22 in which recesses 24 are formed to support the rocker 45. The rocker 45 lies in these recesses 24 with two end axial extensions 26 which project laterally. For reasons of weight the rocker 45 on its end section facing away from the insertion slot is provided with a hole 49. The rocker 45 and frame 21 are punched parts produced from sheet metal. The recesses 24 in the side walls 22 are made open in a u-shape toward the edge of the side walls and have an undercut region into which the axial extensions can be inserted from the open side. The axial extensions 26 are made rectangular in cross section. By turning the inserted rocker from the insertion position into the operating position the axial extensions move into the region of the undercuts. In this way the rocker 45 in the operating position cannot be lifted out of the recesses 24. Support of the rocker 45 in the frame 21 is thus imprecise and can cause rattling noise.

In the illustrated example as shown in FIG. 1, to prevent rattling noise there is a spring clip 9. It has two clip arms 191 and a crosspiece 193 which is made clamp-like and which connects the clip arms 191. The ends of the clamp arms 191 are made as hooks 192. The spring clip 9 is anchored via the hooks 192 on the frame, especially on the uprights 23 which project vertically from the frame 21. The crosspiece 193 which is made clamp-like surrounds the end section of the rocker 45, which section is provided with a hole 49. The spring clip 9 limits or prevents relative movements of the rocker 45 relative to the frame 21. Rattling noise of the belt lock 1 is thus largely prevented.

Figure 13:
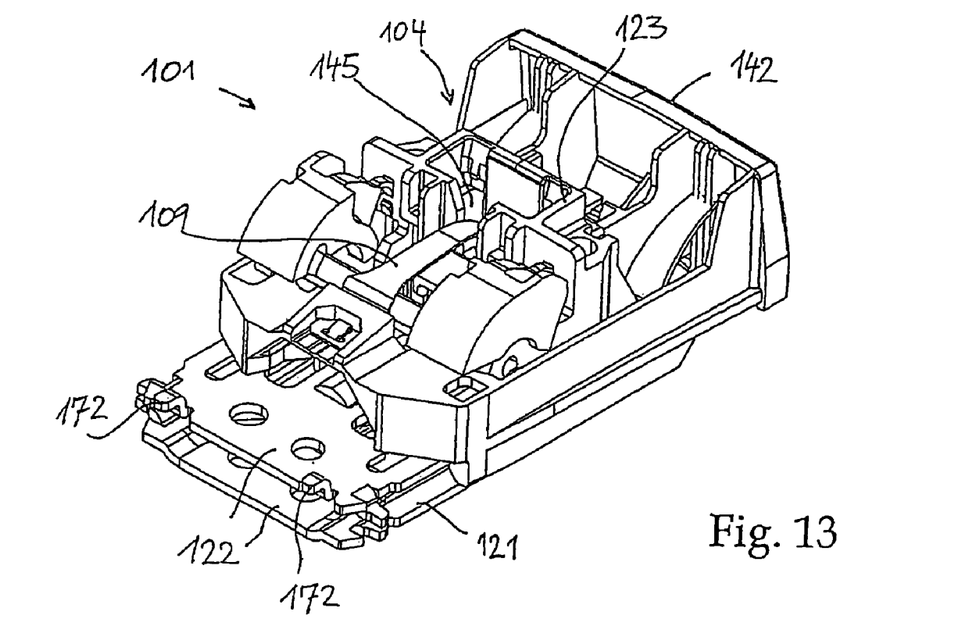
FIG. 13 shows a perspective sketch of a belt lock of a type with a translationally guided locking body, without the housing.
Figures 14, 15:
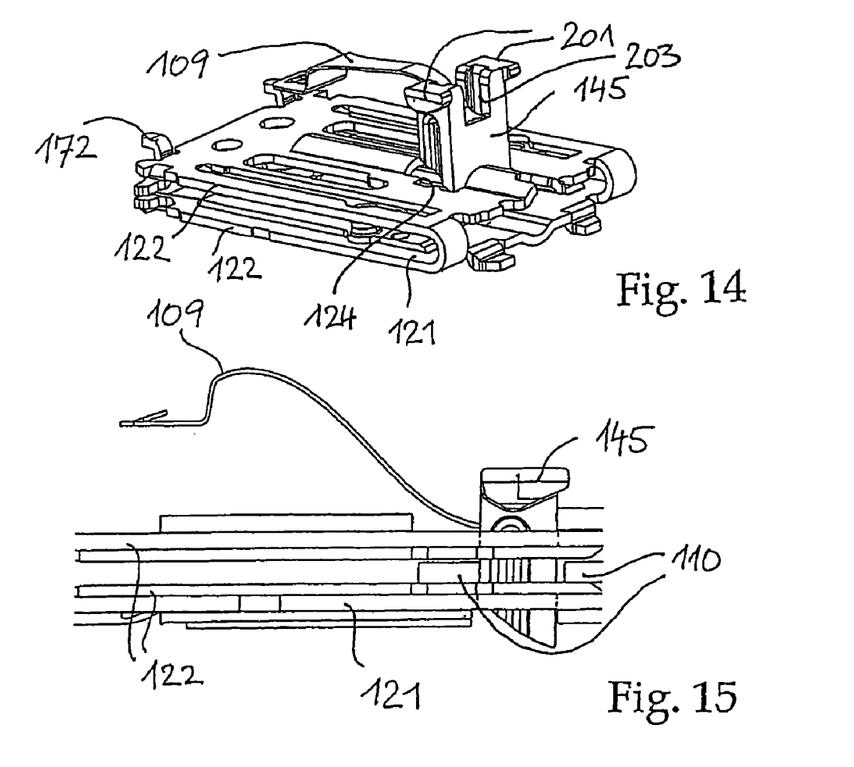
FIG. 14 shows a perspective sketch of the locking part of such a belt lock in the unlocked position.
FIG. 15 shows a side view of these locking parts in the locking position.

FIGS. 13 to 15 show a second known belt lock without the housing. FIGS. 14 and 15 shows the belt lock reduced to the parts which are most important for locking. This belt lock is labelled with reference number 101. The belt lock 101 has a frame 121. This frame 121 is a sheet metal part which is bent essentially in a U-shape. In the frame 121 a locking mechanism 104 is held. The locking mechanism 104 comprises a locking body 145 which is supported to be able to move transversely through the legs 122 of the frame 121, and a mounting spring 109 for pretensioning the locking body 145. The frame 121 has two parallel legs 122 in which recesses 124 are formed for routing the locking body 145 through. Furthermore the locking mechanism comprises an ejector (not shown) which is pretensioned with a compression spring in the direction of the insertion slot and which is guided between the two legs 122. An unlocking button for unlocking a belt lock 110 which is locked in the lock (FIG. 15) is labelled 142.

The locking body 145 is translationally supported in a guide body 123 which is located stationary on the frame 121 perpendicular to the legs 122 of the frame 121. The unlocking button 142 can be translationally moved parallel to the legs 122. It has a link which interacts with the locking body and with which the locking body 145 is raised into the unlocked position against the spring force of the mounting spring 109 out of the locking position when the unlocking button is actuated. Thus the locking tongue of the belt buckle 110 (FIG. 15) which has been inserted between the two legs 122 is released so that it is ejected by the ejector (not shown) as a result of this spring force applied to the ejector.

The object of the invention is to propose a switching element with which the locking or unlocking state of standard belt locks which have a frame and a locking body which can move relative to the frame for locking of the belt lock can be reliably and easily monitored.

This object is achieved as claimed in the invention by the features of the independent claim 1.

This object can be achieved especially with a switching adapter for mounting in a belt lock and for monitoring the locking and unlocking state of the belt lock. The switching adapter is made as a monolithic plastic part and has at least two adapter regions which are made to be able to move relative to one another. The first adapter region bears a first switching part, for example a touch contact head or a Hall sensor, and the second adapter region bears a second switching part, for example a second touch contact head or a field magnet.

This object is achieved accordingly in a belt lock, especially in a belt lock for a safety belt of a motor vehicle, which is equipped with a locking mechanism and a state sensor which monitors a component which changes its location when the locking mechanism is actuated, and has the following features. The state sensor is integrated in a switching adapter which is made as a monolithic component, is mounted with a first adapter region on a frame of the belt lock, and with a second adapter region which can be moved relative to the first it is in contact with the movable component of the locking mechanism which is to be monitored. This switching adapter on the two adapter regions which can move opposite one another bears two switching parts which can move with them against one another.

The means for connecting the first adapter region to the belt lock are preferably made such that they can be positively locked in a belt lock which is suited for unmonitored operation. This allows uniform execution of belt locks regardless of whether they are to be monitored or not. It also allows simple retrofitting of an unmonitored belt lock with a monitoring means by a switching adapter as claimed in the invention being locked and electrically connected.

This switching adapter can moreover be used as a rattle suppression part. This rattle suppression part for installation in the belt lock to prevent rattling of a rocker which is coupled to the frame of the belt lock for locking the belt buckle of a safety belt in a belt lock, has a first adapter part for anchoring on the frame and a second adapter part for fixing on the rocker. As claimed in the invention, the first and the second adapter part are connected to one another via a hinge for defining the pivoting axis of the rocker. In the rattle suppression part a rattle suppression spring can be integrated, as has been conventional to date. The rattle suppression part moreover defines a pivoting axis for the rocker; this not only suppresses rattling, but also allows formation of the rattle suppression part as a switch for monitoring the state of the belt lock. The precision of the pivoting axis allows any type of switch, especially contactless and touch contact switches, to be used. The rattle suppression part is preferably a plastic part with a film hinge.

The plastic part which is suited for mounting in a belt lock for vehicle safety belts of the belt lock type with a frame and a rocker coupled to the frame for locking a belt buckle in the belt lock has two adapter regions. Preferably the first adapter region on its first end has a cross arm and on the latter has one or preferably two lengthwise arms which are connected to the cross arm with one retaining hook each for anchoring the first adapter region on the frame of the belt lock. On this first adapter region a second adapter region connected to the cross arm is formed. The second adapter region is connected to the lengthwise arm via the cross arm and at least one film hinge which runs parallel to the cross arm. On the second adapter region a fastener for positive fixing of this adapter region on the rocker is formed. The film hinge can be made between the cross arm and the lengthwise arm and/or between the cross arm and second adapter region.

By using a plastic part with a second adapter region which is located on the cross arm and which can be fixed to a snap hook in the rocker of the belt lock, and a lengthwise arm which is connected to the cross arm and which can be anchored on the frame, in a belt lock, by forming a hinge between the lengthwise arm and cross arm and/or preferably between the second adapter region and cross arm the pivoting axis of the rocker can be defined. In this way rattling noise is prevented. A belt lock with such a plastic part which is fixed with the snap hook on the second adapter region on the rocker and is anchored to the retaining hook on the lengthwise arms on the frame is economically prevented from rattling.

In this switching adapter, advantageously on the first adapter region means are formed for immovable connection of the first adapter region to the belt lock, especially the frame of a belt lock. The second adapter region furthermore has means for positive connection of the second adapter region to a component of the belt lock which assumes a locking position and an unlocking position which is different from it. In addition or alternatively, the second adapter region can have pretensioning which ensures a nonpositive connection of the second adapter region to the movable component of the belt lock.

The second adapter region advantageously forms an arm with one free end, and this arm can be articulated to the first adapter region. Alternatively its second, free end relative to the first adapter region can be elastically connected to the latter.

So that the switching parts execute a movement as large as possible, the switching parts are advantageously located on the free end of these arms and near this point on the first adapter part.

If the first and second adapter region are elastically connected to one another, preferably a metallic spring is integrated in the plastic part such that it extends into the first and second adapter region, for example extends U-shaped with the legs into parallel parts of the two adapter regions.

So that this adapter can reliably interrogate the locking state of a belt lock, it is advantageously provided in a belt lock that the movable component in the locking or unlocking process assumes one of two alternative end positions. Preferably the movable component is a locking body or at least one part which can necessarily be moved with it, or a part necessary for movement. Aside from a rocker, the movable component can be a locking body which is translationally guided in a guide or a part which can necessarily move with it, especially a mounting spring for acting on the locking body.

The plastic part can be made with switching elements integrated in it and as a single piece can be installed very easily in the belt lock. One advantage of such a state switch consists in that the switching elements are supported to be able to move relative to one another with the precision of the plastic part. This precision is much higher than for example the precision of movement of the rocker in the frame. The state can therefore be more reliably detected.

In a switching adapter for belt locks with a rocker the cross arm advantageously forms a clamp with which the end of the rocker can be encompassed. In this way forces which are acting in the insertion direction and which can act on the rocker for example when a belt buckle is inserted are transmitted to the lengthwise arm and to the frame via this clamp. These forces thus do not act on a film hinge between the second adapter region and cross arm.

Advantageously in the second adapter region and in one of the lengthwise arms one switching element each is integrated. If a plug-in connection part with plug-in contacts is made on the plastic part, with which plug-in contacts the switching elements are connected by electrical conductivity, thus a connecting cable to a control can be inserted only into this plug-in connection part. This facilitates the production sequence.

The switching elements can be a magnet and a Hall sensor, especially a magnet and a differential Hall sensor which delivers more unambiguous signals than a simple Hall sensor.

The switching elements can however also comprise two touch contact heads which interact via contact and separation. Essentially any switching elements which operate without contact and also with contact are possible. Only Reed switches, capacitive sensors, and inductive sensors will be explicitly mentioned here.

Advantageously on the plastic part a housing which protects the switching elements against dirt is formed and the switching elements are located in this housing.

It can therefore be stated that one version of the invention calls for combining the components of a state switch or state sensor into a monolithic component which can be mounted in its entirety in the belt lock. Thus especially a Hall sensor adapter for installation in a belt lock is formed which has two adapter regions which are made to be able to move relative to one another, a first adapter region bearing a Hall sensor and the second adapter region bearing a field magnet. The Hall sensor adapter has an especially space-saving construction. It does not require additional components, for example pretensioning springs, actuators, or the like; for its operation it only uses movable components which are present anyway in the belt lock, especially the movement of the rocker which carries the locking body relative to the frame. In this case it can be mounted very easily as a monolithic component, especially can be hung and clipped in.

Comparatively high signal levels and thus high signal-to-noise ratios can be achieved by the relative motion of a field magnet to the Hall sensor. The Hall sensor arrangement is located in the mounted state on the side of the belt lock facing away from the passengers. In this way any adverse effect by external magnetic fields, for example by a magnet located in the pocket of the pants or coat of a passenger, is largely prevented. The Hall sensor arrangement located in the adapter is located within the belt lock. In this way the metallic components surrounding the Hall sensor arrangement, especially the frame, have a shielding effect. The selected arrangement makes the Hall sensor adapter relatively invulnerable to external disturbances. Therefore the Hall sensor can be made as a conventional Hall sensor with one measurement field or as a differential Hall sensor with two measurement fields which are located next to one another. The Hall sensor adapter is also characterized in that no modifications of the belt lock are required for its installation. In the installed state the Hall sensor adapter also largely suppresses rattling noise of the belt lock by suppressing larger relative motions of the rocker relative to the frame of the belt lock.

In one advantageous version of the state sensor one adapter part has two lengthwise arms with free ends which are provided with retaining hooks. In the installed state the retaining hooks surround two uprights which project roughly vertically from the frame of the belt lock. The lengthwise arms are connected by a cross arm which is made clamp-like and in the mounted state clamps around an end section of the rocker which can be tilted in two end positions. The second adapter part is therefore made as a clip which is movably coupled to the cross arm via a hinge joint and which has fasteners for locking to the corresponding counterparts on the rocker. The hinge joint is advantageously made as a film hinge. Film hinges can be easily produced and for suitable material selection and shaping have a relatively high strength and long service life. Due to the flat execution of the film hinge, deflections laterally are largely avoided. Side braces of the film hinge can largely further limit them.

The fasteners provided on the clip encompass snap hooks which can be guided through a hole of the rocker and can be locked to the rocker. Pressure pads located on the bracket in the mounted state of the adapter press against the rocker and provide for positive and nonpositive locking of the clip with the rocker. This ensures that the clip cannot be detached from the rocker even by larger vibrations and the function of the state sensor arrangement is preserved.

The Hall sensor and the field magnet can be located permanently or removably on the Hall sensor adapter. In one preferred version the Hall sensor is located in a receiver which is provided on one of the lengthwise arms of the adapter. The field magnet is located in the vicinity of the Hall sensor on the clip. It goes without saying that the arrangement of the Hall sensor and the field magnet can also be interchanged. In this case the Hall sensor is moved relative to the stationary field magnet when the rocker moves. Due to the stresses on the signal lines connected to the Hall sensor which may occur however the reverse arrangement is preferred.

For large-scale production it is advantageous if the Hall sensor adapter is made as a plastic injection molding. This allows production with very small production tolerances. The hinge joint can be made for example as an integral film hinge. It has also been found that an articulated arrangement can also be achieved by the second adapter region which can move with the movable part of the belt lock being made in a relatively thin material thickness. An altogether filigree execution of the second adapter region 85 allows pivoting of the rocker around an axis which cannot be exactly identified geometrically on the adapter as a result of the elasticity of the plastic. Execution without a film hinge is moreover simpler for injection molding.

Other advantages and features of the invention will become apparent from the following description of embodiments of a belt lock. The figures are schematic.

Figure 2:
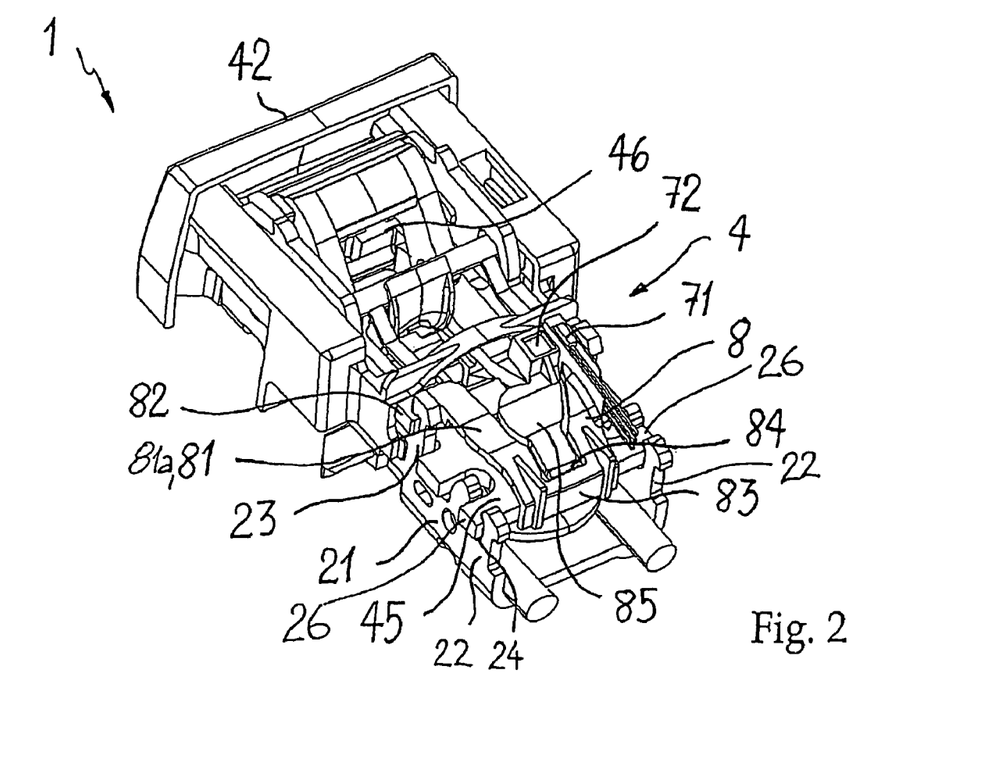
FIGS. 2 to 4 show different views of a first embodiment of the invention with a Hall sensor, implemented on the belt lock as shown in FIG. 1.
Figure 3:
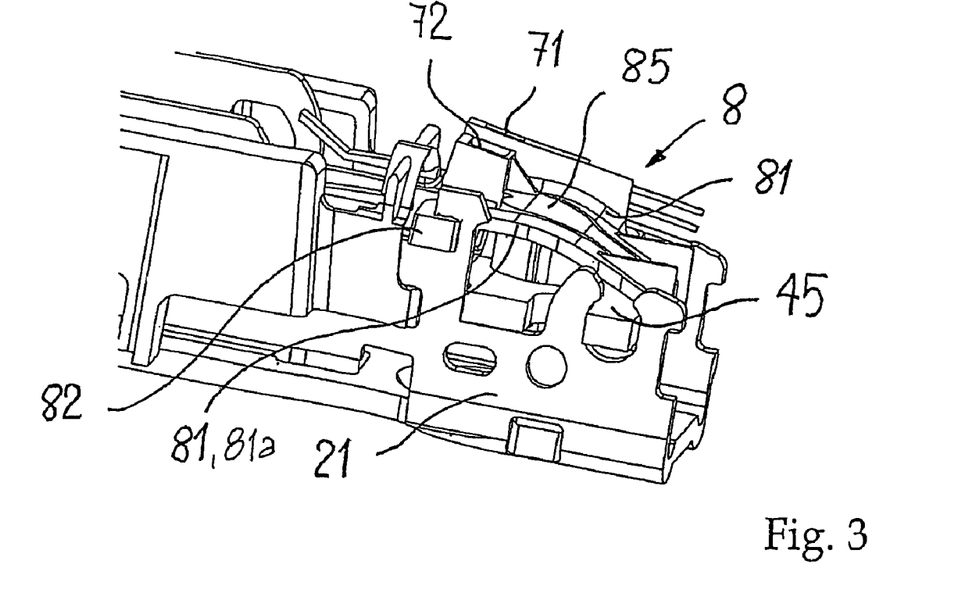
Figure 4:
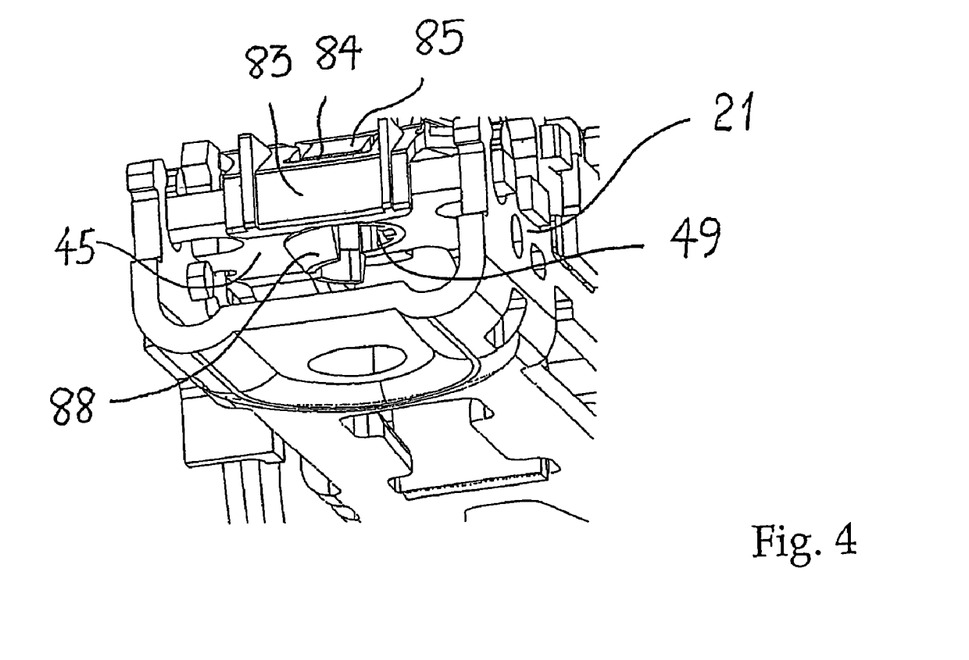

FIG. 2 shows one embodiment of a belt lock made as claimed in the invention in a representation similar to FIG. 1. For purposes of better clarity, the compression spring (reference number 48 in FIG. 1) is not shown. The belt lock is in turn provided with reference number 1. FIGS. 3 and 4 furthermore show views of the belt lock as claimed in the invention as shown in FIG. 2. As is directly apparent from the figures, the belt lock 1 instead of a spring clip (reference number 9 in FIG. 1) has an adapter 8 which bears a state sensor, especially a Hall sensor arrangement.

Figure 5:
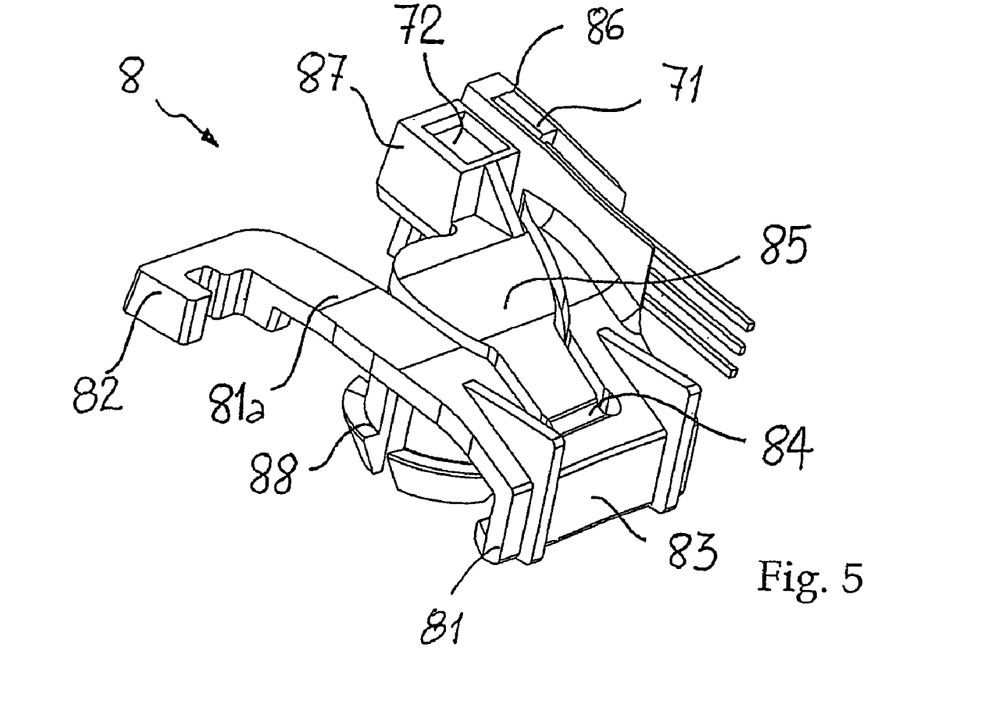
FIGS. 5 and 6 shown two views of the Hall sensor as shown in FIGS. 2 to 4.
Figure 6:
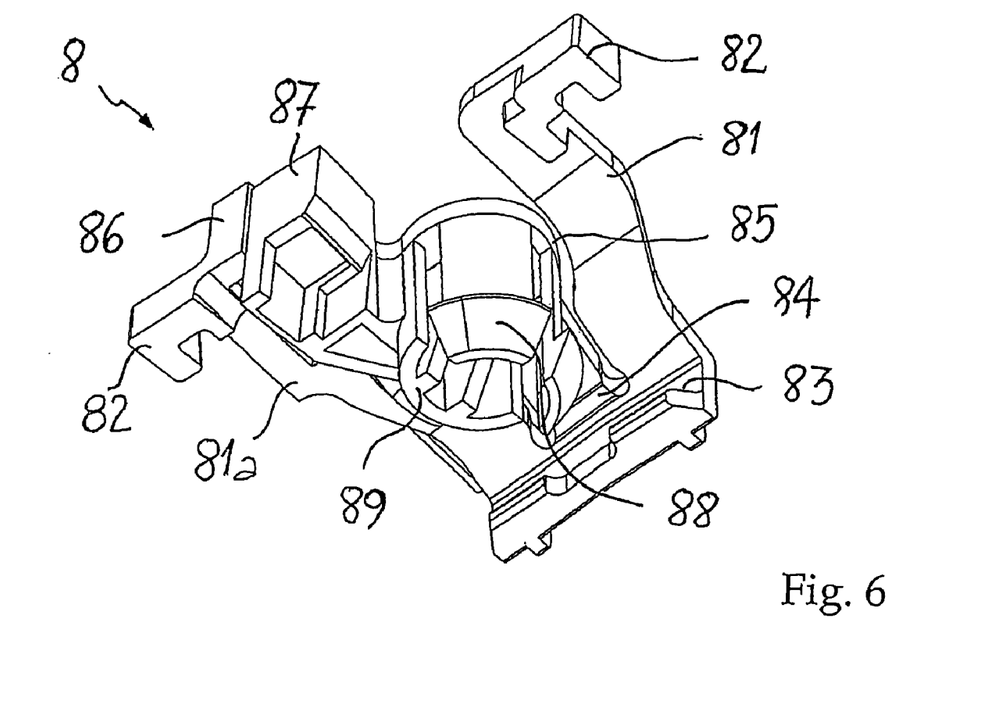

The adapter 8 which is shown in FIGS. 5 and 6 in two views on an enlarged scale has two lengthwise arms 81a which are connected by a cross arm 83 which is made in the manner of a clamp. The lengthwise arms 81a which extend in the direction of the insertion slot are provided on their ends with retaining hooks 82. The retaining hooks 82 are used to anchor to the uprights 23 projecting vertically from the frame 21. Shoulder-like projections on the uprights prevent unintentional detachment of the anchoring of the hooks 82 on the uprights 23. The cross arm 83 which is made in the manner of a clamp in turn surrounds the end section of the rocker 45. In this way larger relative movements of the rocker 45 against the frame 21 are suppressed and rattling noise is largely prevented. From the cross arm 83 of the adapter 8 a clip 85 projects and extends in the direction of the lengthwise arms 81a. The clip 85 is coupled via a hinge joint 84, preferably a film hinge, to be able to move on the cross arm 83 of the adapter. From the bottom of the clip a snap hook 88 projects, passes though the hole 49 in the end section of the rocker 45 and extends positively behind it. A pressure pad 89 opposite the snap hook 88 is supported on the surface of the rocker 45. In this way the movably coupled clip 85 is fixed positively and nonpositively on the rocker 45. The fixing of the clip 85 on the rocker is preferably detachable.

One of the lengthwise arms 81 of the adapter 8 has a receiver 86 for a Hall sensor 71. For example, the receiver 86 is made as a slot into which the Hall sensor 71 which can be made as a Hall sensor with one measurement field or as a differential Hall sensor with two measurement fields which are located next to one another can be inserted and can be fixed with respect to its location. Signal lines connect the Hall sensor 71 to an evaluation means. On the free end of the clip 85 there is the holding device 87 for the field magnet 72 of the Hall sensor arrangement. The field magnet 72 is within the very narrow production tolerances of the adapter 8 in an exactly definable position relative to the Hall sensor 71. Additionally installed spacers can limit the play of the air gap between the receiver 84 for the Hall sensor 71 and the holding device for the field magnet 72, and the set operating threshold can be ensured. The clip 85 which is movably coupled via the hinge joint 84 by the connection to the rocker 45 also executes its up and down motion in the locking and unlocking of the belt buckle and moves relative to the lengthwise arms 81 which are anchored to the vertical uprights 23. In this motion of the clip 85 the field magnet 72 is moved at the same time relative to the Hall measurement fields of the Hall sensor 71 which is mounted on the stationary lengthwise arm. The magnetic field difference which occurs in this connection is detected, relayed via the signal lines to the evaluation device and from it for example the signal "passenger belted" or "passenger not belted" is generated.

The Hall sensor adapter is a plastic part which is preferably produced in a plastic injection process. This allows production with very small production tolerances. The hinge joint can be for example made as an integral film hinge. Lateral hinge deflections can be further limited by side braces of the film hinge. On the elements of the adapter which are used for anchoring, there can be other braces to ensure secure anchoring. The adapter can be anchored detachably or also captively on the frame and on the rocker. The Hall sensor and the field magnet can be located fixed or removably on the adapter. It goes without saying that the arrangement of the Hall sensor and of the field magnet can also be interchanged. In this case the Hall sensor is moved in the motion of the rocker relative to the stationary field magnet. But due to the stresses which may however occur on the signal lines which are connected to the Hall sensor the reverse arrangement is preferred.

The Hall sensor adapter has an especially space-saving construction. It requires no additional components, for example pretensioning springs, actuators or the like; for its operation it only uses the movable components which are present anyway in the belt lock, especially the motion of the rocker relative to the frame. In this connection it can be very easily mounted, especially hung or clipped in, as a monolithic component. The relative motion of the field magnet to the Hall sensor can achieve comparatively high signal levels and thus high signal-to-noise ratios. The Hall sensor arrangement in the installed state is on the side of the belt lock facing away from the passenger. In this way any adverse effect by external magnetic fields, for example by a magnet or the like which is located in the pocket of the pants or coat of the passenger, is largely prevented. The Hall sensor arrangement located in the adapter is located within the belt lock. In this way the metallic components surrounding the Hall sensor arrangement exert a certain shielding effect. This arrangement makes it possible to execute the Hall sensor arrangement with a conventional Hall sensor with one measurement field or with a differential Hall sensor with two measurement fields. The Hall sensor adapter is characterized in that no modifications of the belt lock are necessary for its mounting. In the installed state the Hall sensor adapter also largely suppresses rattling noise by larger relative movements of the rocker relative to the frame of the belt lock being prevented and the pivoting axis with the hinge 84 being relatively precisely defined.

The exact definition of the pivoting axis prevents not only rattling noise, but also allows reliable detection of the position of the two adapter parts 81 and 85 to one another. The precision of the pivoting motion of the rocker is relatively high due to the execution of this hinge 84, so that contact switches can also be integrated in the plastic part 8.

Figure 7:
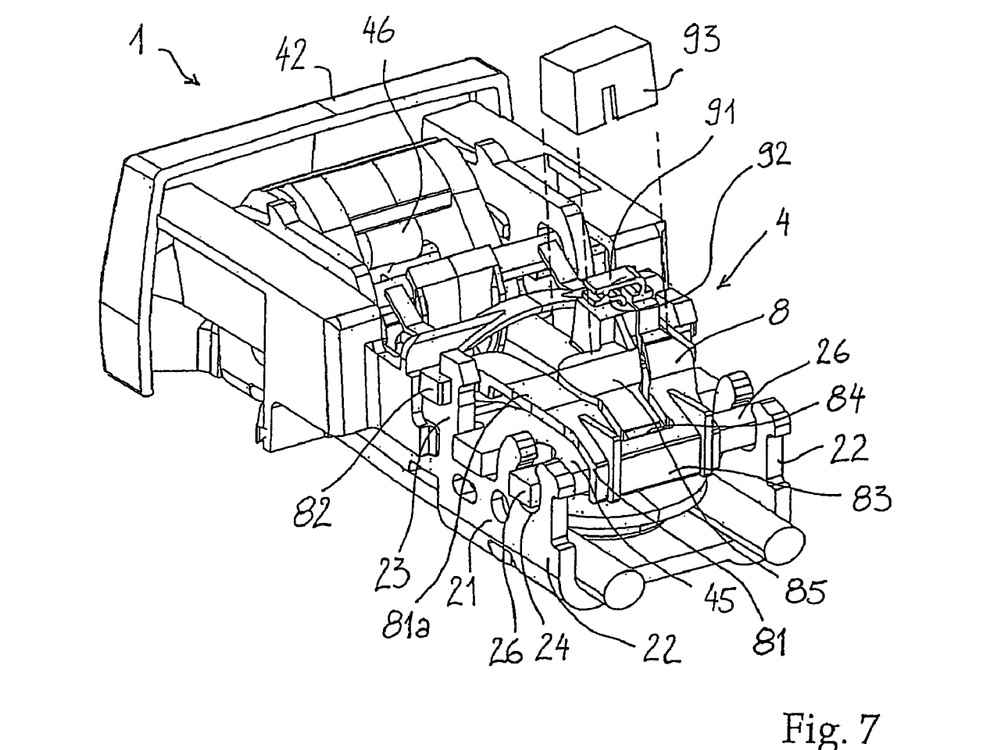
FIGS. 7 and 8 show two views of a second embodiment of the invention with a contact switch, implemented on a belt lock as shown in FIG. 1.
Figure 8:
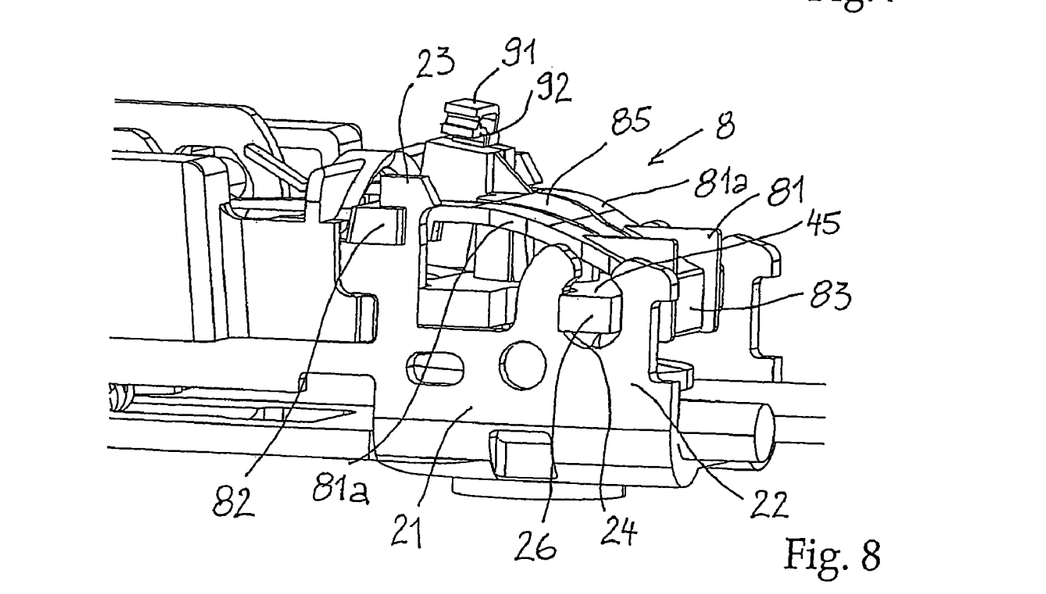

The embodiment as shown in FIGS. 7 and 8 shows an adapter part 8 as claimed in the invention which is equipped with contact breaker heads 91, 92. It is built exactly like the embodiment as shown in FIGS. 2 to 4. In contrast to the latter, in place of the proximity switch, the Hall sensor 71 with the magnet 72, a first breaker head 91 and a second breaker head 92 are made which can be moved into and out of contact. The illustrated breaker heads 91 and 92 are made as interrupters. This means that the contact between the two breaker heads 91 and 29 is broken when the safety belt buckle is locked into the belt lock 1. One approach in which the breaker heads 91, 92 are in contact with the belt buckle locked, separated with the belt buckle unlocked, is likewise possible.

FIG. 7 moreover shows a hood 93 which can be slipped onto the touch contact and which protects the switch against dirt. The hood can also be made integrally with the adapter, as shown in FIG. 11.

Figure 9:
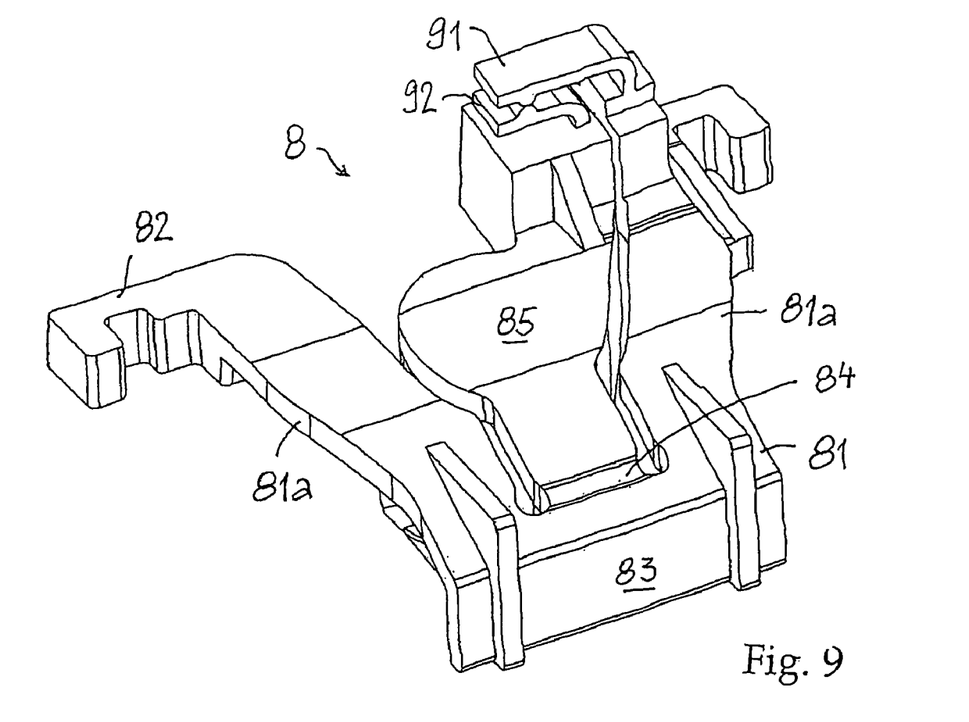
FIGS. 9 and 10 show two views of the switch adapter as shown in FIGS. 7 and 8.
Figure 10:
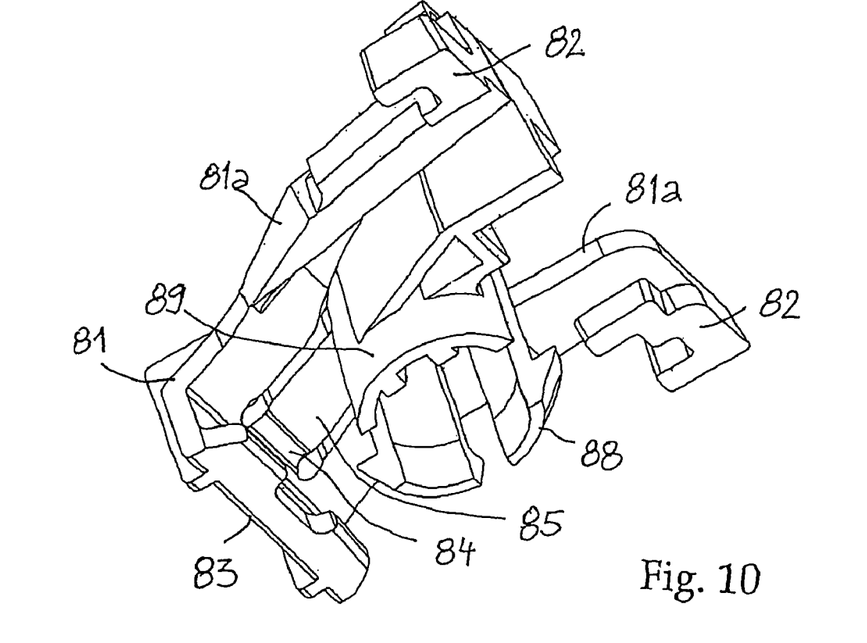

The adapter which is shown in FIGS. 9 and 10 corresponds exactly to the adapter shown installed in the belt lock in FIGS. 7 and 8. It has two adapter parts 81, 85. The first adapter part 81 consists here of two lengthwise arms 81 on which hooks 82 are formed for anchoring on the frame of the belt lock, and which are connected by a cross arm 83. The cross arm 83 is made clamp-like, in order to clamp around the end of the rocker 45. In this cross arm the rocker can be pivoted. The pivoting axis of the rocker is defined essentially by the film hinge 84 between the cross arm and the second adapter part 85. This film hinge 84 is placed such that in the mounted state it lies on the axis of the axis extensions 26 of the rocker 26.

Figure 11:
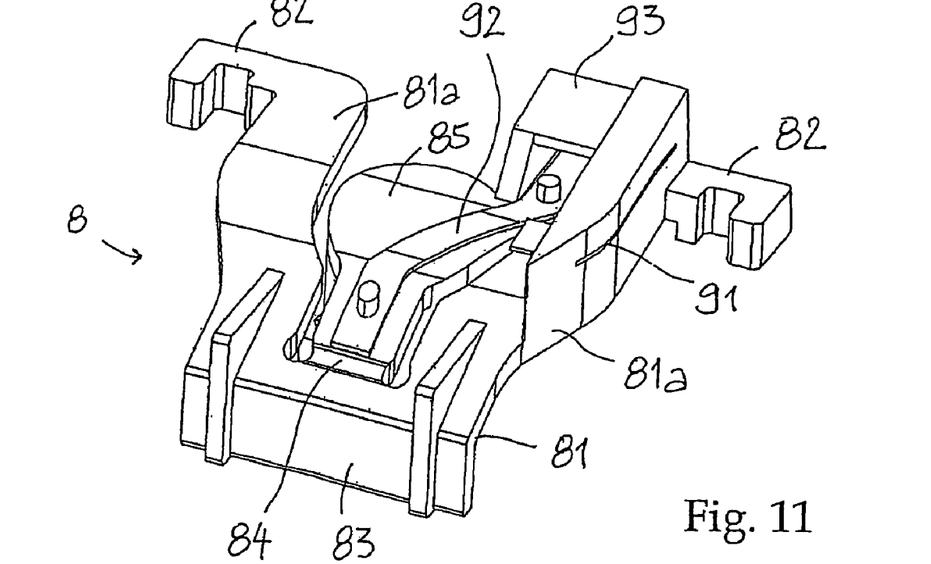
FIG. 11 shows a view of another embodiment of a switch adapter as claimed in the invention with touch contacts.
Figure 12:
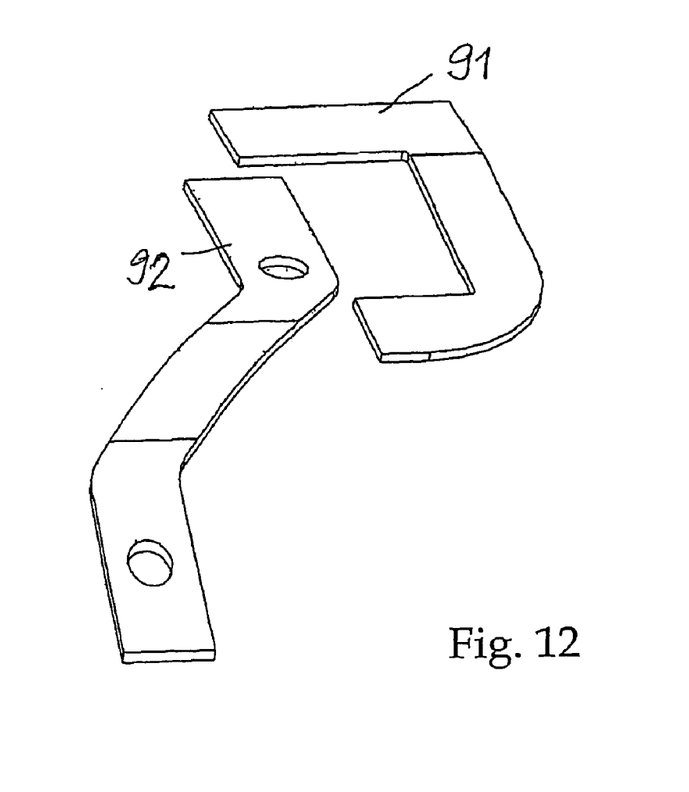
FIG. 12 shows the touch contacts for the adapter as shown in FIG. 11.

An adapter of essentially identical structure is also shown in FIG. 11. It is likewise provided with a touch contact. The touch contact is then formed by two circuit boards 91 and 92 which with the belt buckle disengaged are in contact, but are separated with the belt buckle locked. These circuit boards 91, 92 are potted into the plastic part of the adapter. A hood 93 is moreover made on the adapter. In this example the hood is made on the second adapter part 85. It is moreover possible to make the hood on the first adapter part 81.

Connecting means for control with which the operating signal is detected are not shown. Connecting means are connected to the contact elements 91, 92. A connection can be established by cables with plug-in contacts and with the corresponding sockets on the contact elements 91, 92. Cables can however also be attached directly to the contact elements 91, 92, for example by soldering, riveting or clamping.

Figure 16:
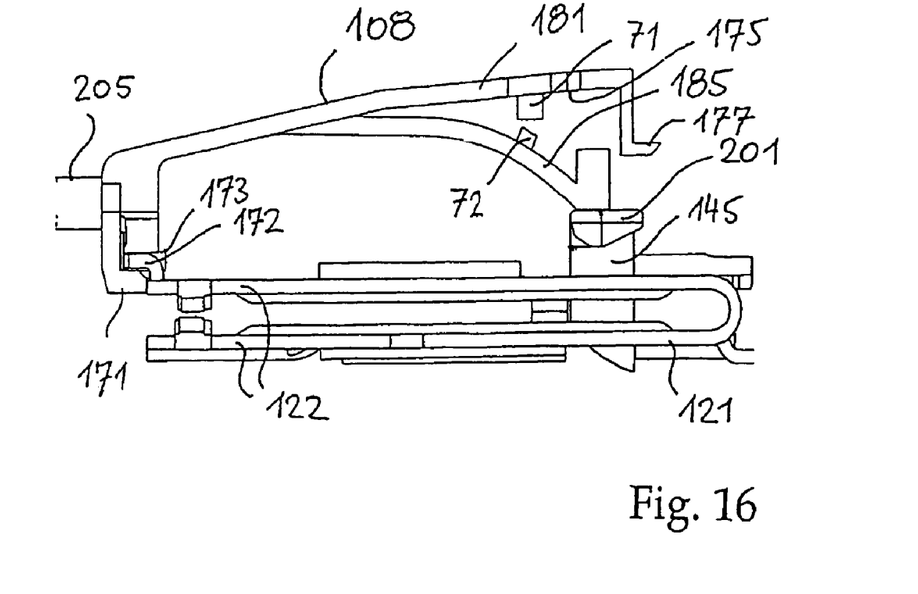
FIG. 16 shows a side view corresponding to FIG. 15 with a switching adapter with a second adapter region which directly strikes the locking body.

The switching adapters shown in FIGS. 16 to 21 are designed to be locked or inserted into the belt lock as shown in FIGS. 13 to 15. FIG. 16 shows such a switching adapter in conjunction with the frame 121 and the locking body 145. The switching adapters for these belt locks are labelled 108. Different versions of these switching adapters 108 and their parts are labelled with the same reference number for purposes of simplification, regardless of the version.

The switching adapter 108 shown in FIG. 16 has two adapter regions: a first adapter region 181 which is locked on the frame 121 and on the guide 123 (shown only in FIG. 13), and a second adapter region 185 which rests elastically on the locking body 145. The locking body 145 between two projections 201 (FIG. 14) has a notch 203 in which the mounting spring 109 lies. The projections 201 fit into the links of the unlocking button with which the locking body can be raised out of the locking position into the unlocked position. The second adapter region 185 then lies with its free end on one or both of these projections, so that the mounting spring under the second adapter region can move untouched by it. Laterally on the second adapter region 185 there is a permanent magnet 72. Opposite it on the first adapter region there is a sensor 71.

The second adapter region 185 is made elastic relative to the first 181.

Figure 17:
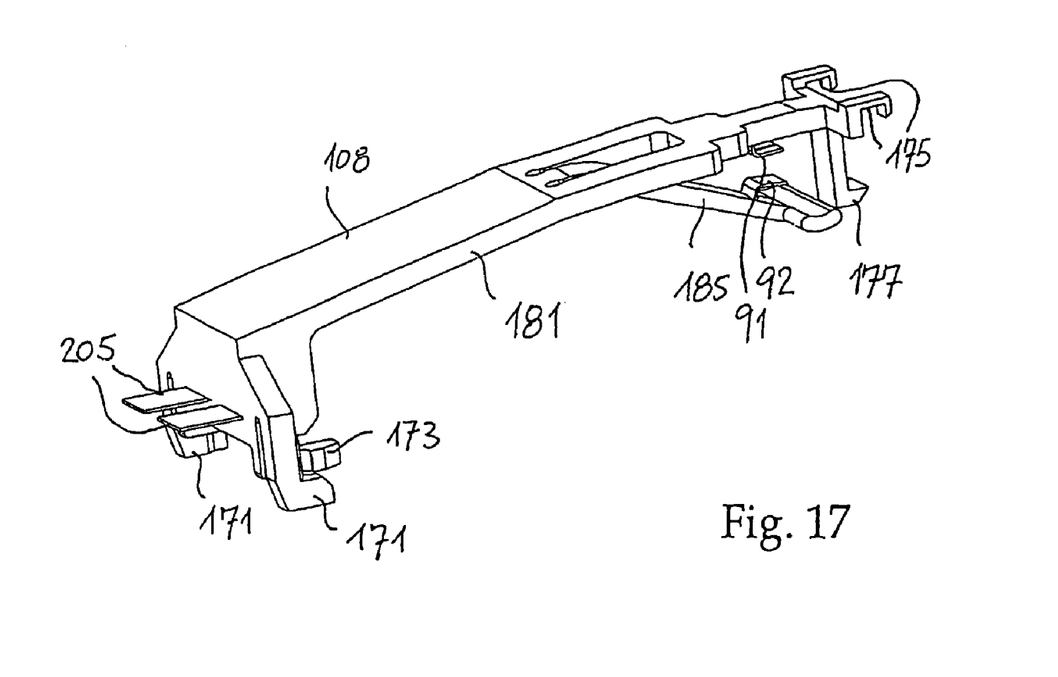
FIG. 17 shows a perspective sketch of a switching adapter which is shaped to directly strike the locking body.

FIG. 17 shows a switching adapter 108 which likewise strikes the locking body 145. The adapter region 181 has locking fasteners which interact with the frame 121 and with the guide 123 and by means of which the switching adapter 108 can be attached stationary on the frame 121. On its connecting end two extensions 171 are made and extend under the fingers 172 which are formed on the frame (FIGS. 13, 14, 16). Furthermore two extensions 173 are formed and lie on one leg 122 and between the fingers 172 fix the lateral position of the switching adapter 108. These extensions 171 and 173 are made on all switching adapters 108.

The first switching adapter region 181 is fixed on its connecting end with these extensions 171, 173. On its switch end opposite the connecting end the sensor or switch is located. On the switch end the first adapter region 181 is formed to rest on the guide 123 and to lock into it. The rest 175 for resting on the guide 123 extends around the wall of the guide so that the switching adapter is held fast in its lengthwise direction and therefore the extensions 171, 173 cannot be pushed to disengage from the frame. So that this rest 175 cannot be lifted to disengage from the wall of the guide 123, a locking catch 177 is also made on the switch end. It can also be made differently (compare also FIG. 23).

The first adapter region 181 encompasses the second adapter region 185 which is made finger-shaped. At the point on which the second adapter region is connected to the first adapter region the first adapter region 181 is divided into two arms. These arms accompany the second adapter region on both sides and are again connected to one another on the other side of a window which has been formed in this way and form the rest 175 and the locking catch 177 there. The locking catch engages the guide 123 for the locking body and extends behind its wall in the region in which the locking body 145 has its notch 203 (FIG. 14) for the mounting spring 109.

On the connecting end of the switching adapter there are connections 205 for the parts of the switch or sensor which are to be electrically connected. For the switching adapter 108 as shown in FIG. 17 the switch is formed by two conductors which touch one another in the unlocking position of the locking body 145.

Figure 18:
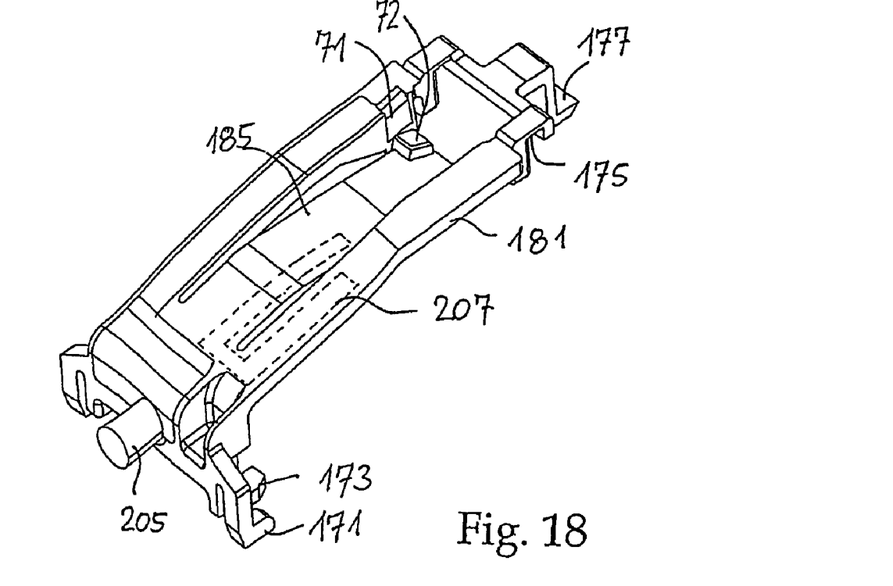
FIGS. 18 to 21 show perspective sketches of switching adapters for a belt lock according to FIGS. 13 to 15 which strike the mounting spring for acting on the locking body.
Figure 19:
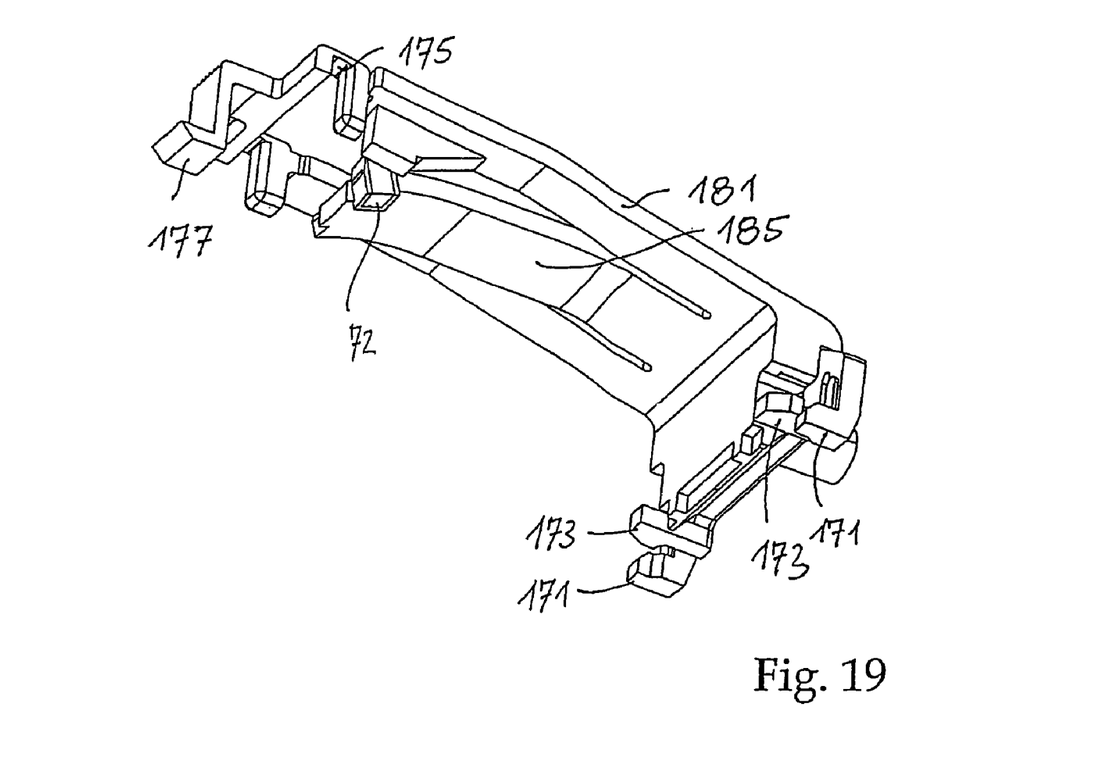

FIGS. 18 and 19, and 20 and 21 likewise show the above described extensions 171, 173, the rest 175 and the locking catch 177. The rest 175 in FIGS. 17 and 21 rests on the same wall of the guide into which the locking catch locks. The rest 175 rests moreover in FIGS. 16, 18, 19 and 20, not on the same wall of the guide into which the locking catch locks, but on the wall opposite it. The second movable adapter regions 185 are made for the switching adapters as shown in FIGS. 18 to 21 such that they rest with slight pressure on the mounting spring 109. So that the spring action of the second adapter parts 109 remains large enough over many movements in the course of using the belt lock, a metal spring can be potted into the plastic of the switching adapter 108. This metal spring is shown in FIG. 18 with broken lines and is labelled 207.

Figure 20:
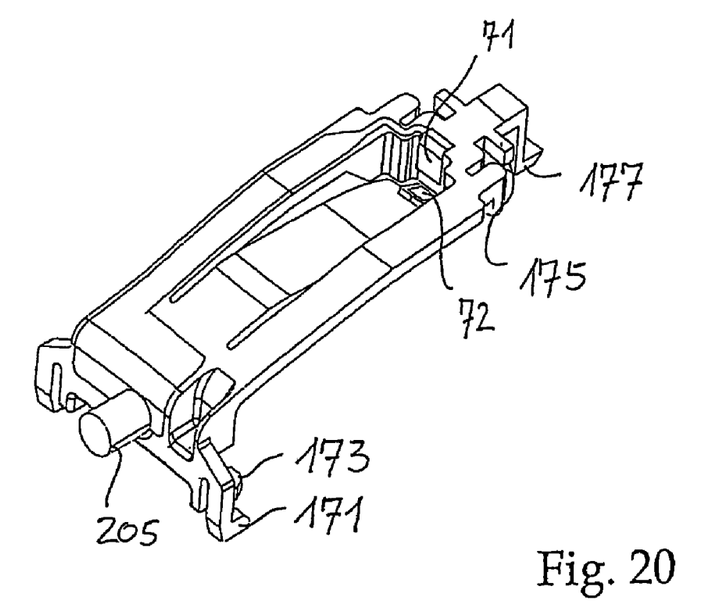
Figure 21:
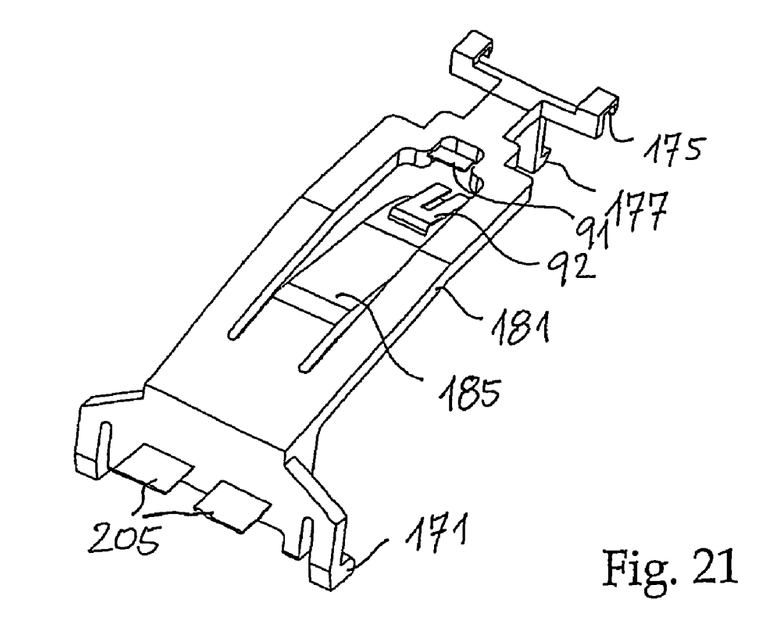

FIGS. 16 to 21 moreover show different placements of the switches. This end symmetrical arrangement is shown in FIGS. 17, 20 and 21. In this connection the stationary conductor which is inserted in the first adapter region 181 can be made symmetrical in both arms of the first adapter part or asymmetrically only in one arm of the first adapter part 181. The connections 205 of each conductor are advantageously made asymmetrical in order to form a symmetrical arrangement together.

In FIGS. 16, 18, 19 and 20 there are proximity switches in which the conductors are routed only to one of the switching parts. The other switching part, in the examples located on the movable second adapter region, is a magnet or of magnetic material. The conductors are therefore inserted, cemented or potted in the first adapter region, especially in the arms, and are routed to an attachment plug 205. These conductors can also be routed asymmetrically on one of the arms or symmetrically on the two arms.

Figure 22:
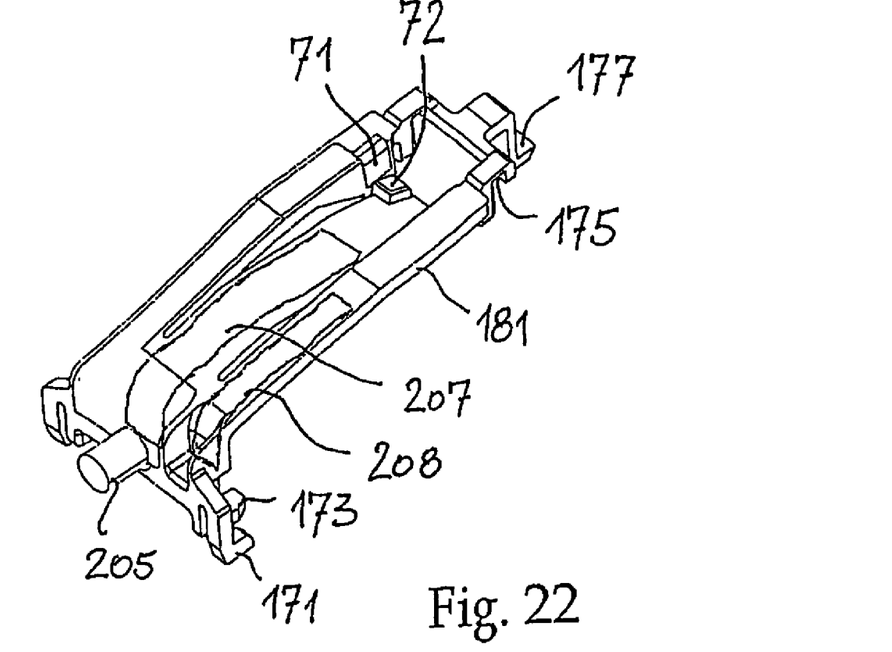
FIG. 22 shows a perspective sketch of the switching adapter as shown in FIG. 18 with a potted spring element which is made linear.

The switching adapter as shown in FIGS. 22 is made identically to the switching adapter as shown in FIG. 18 except for the execution of the metallic spring inserted into the plastic. This spring 207 is not made unshaped in FIG. 22, but rather linear. It has two ends, of which the first is potted in the connecting end of the switching adapter and the second is potted in the movable arm of the switching adapter. To reinforce the first adapter region 181, a metal plate 208 is also inserted in the arm in which there is no sensor.

Figure 23:
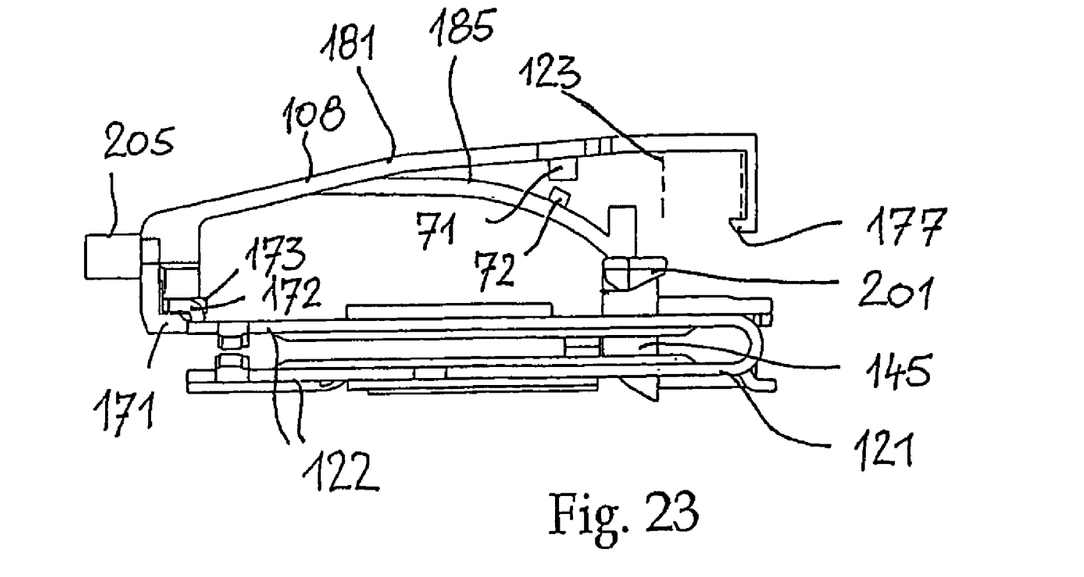
FIG. 23 shows a side view of a switching adapter with a locking catch which extends around the guide for the locking body.

FIG. 23 illustrates the fact that the locking catch 177 can be locked not only from the inside into the guide 123. The switching adapter can also extend around the guide 123 with the first adapter region 181 and engage it from the outside. The first adapter 181 must simply be able to be anchored on a part which does not move in locking and unlocking.

The invention in summary relates to a switching adapter (8, 108) for mounting in a belt lock (1, 101) and for monitoring the locking and unlocking state of the belt lock. This switching adapter (8, 108) is made as a monolithic plastic part and has at least two adapter regions (81, 85; 181, 185) which are made movable relative to one another. The first adapter region (81, 181) bears a first switching part (71, 91) and the second adapter region (85, 185) bears a second switching part (72, 92). This switching adapter is advantageously mounted in a belt lock which has a frame (21, 121) and a locking part (45, 145) which is supported to be able to move relative to the frame, with which locking part in the locking position the belt buckle of a safety belt is locked in the belt lock (1, 101) and is unlocked in the unlocking position. The switching adapter (8, 108) is used in the belt lock for detecting the locking state of the belt lock. To achieve this, the switching adapter (8, 108) and the locking part (45, 145) are dynamically connected such that the switching state of the switching adapter (4, 104) and the location of the locking part (45, 145) can only be changed at the same time.

The invention claimed is:

1. A switching adapter for mounting in a belt lock and for monitoring a locking and unlocking state of the belt lock, the switching adapter comprising:
    a monolithic plastic part having first and second adapter regions which are configured to move relative to one another;
    a first switching part arranged on the first adapter region;
    a second switching part arranged on the second adapter region; and
    means for immovably connecting the first adapter region to the belt lock, the means for immovably connecting being arranged on the first adapter region,
    wherein the second adapter region is configured to connect to a movable component of the belt lock, the movable component being configured to switch between a locking position and an unlocking position, and
    wherein the second adapter region includes at least one of:
        means for positively connecting the second adapter region to the movable component of the belt lock; and
        pretensioning means for ensuring a nonpositive connection of the second adapter region to the movable component of the belt lock.

2. The switching adapter as claimed in claim 1, wherein the second adapter region comprises at least one of a first free end at which a pivoting arm can is formed to be articulated to the first adapter region, and a second free end configured to be elastically connected relative to the first adapter region.

3. The switching adapter as claimed in claim 2, wherein the second switching part is arranged on the first free end of the second adapter region at which the pivoting arm is formed, and
wherein the first switching part is arranged on the first adapter region opposite to the second switching part.

4. The switching adapter as claimed in claim 1, wherein the means for immovably connecting is configured to connect to at least one of a frame and a stationary part of the belt lock.

5. The switching adapter as claimed in claim 1, wherein the second adapter region comprises a pivoting arm,
wherein the first adapter comprises a first end and a second end, and
wherein the means for immovably connecting the first adapter region to the belt lock are in an extension direction of the pivoting arm, and are arranged on the first and second ends of the first adapter region.

6. The switching adapter as claimed in claim 1 wherein the means for immovably connecting the first adapter region to the belt lock are configured to be positively locked into the belt lock.

7. A switching adapter for mounting in a belt lock and for monitoring a locking and unlocking state of the belt lock, the switching adapter comprising:
a monolithic plastic part having first and second adapter regions which are configured to move relative to one another;
a first switching part arranged on the first adapter region;
a second switching part arranged on the second adapter region; and
at least one metallic spring,
wherein the first adapter region is elastically connected to the second adapter region, and
wherein the at least one metallic spring is integrated in the plastic part and extends into the first adapter region and second adapter region.

8. The switching adapter as claimed in claim 7, wherein the spring comprises a first leg extending into the first adapter region and a second leg extending into the second adapter region, and
wherein the first leg and the second leg are connected such that the spring is substantially U-shaped.

9. The switching adapter as claimed in claim 7, comprising a plug-in connector part with at least two plug-in contacts,
wherein the plug-in connector part is arranged on the monolithic plastic part,
wherein a first one of the at least two plug-in contacts is electrically connected to the first switching part, and
wherein a second one of the at least two plug-in contacts is electrically connected to the second switching part.

10. The switching adapter as claimed in claim 7, comprising a housing arranged on the monolithic plastic part and configured to protect the first switching part and the second switching part from dirt.

11. The switching adapter as claimed in claim 7, wherein the first switching part comprises one of a first touch contact head and a Hall sensor, and
wherein the second switching part comprises one of a second touch contact head and a field magnet, corresponding to the one of the first touch contact and the Hall sensor comprised in the first switching part.

12. A switching adapter for mounting in a belt lock and for monitoring a locking and unlocking state of the belt lock, the switching adapter comprising:
a monolithic plastic part having first and second adapter regions which are configured to move relative to one another,
a first switching part arranged on the first adapter region;
a second switching part arranged on the second adapter region,
wherein the belt lock includes a rocker configured to be tilted between two end positions in a mounted state,
wherein the first adapter region comprises two lengthwise arms and a cross arm, which is configured to be clamped around an end section of the rocker
wherein the lengthwise arms each terminate at a first end and a second end, respectively,
wherein the first end and the second end include retaining hooks configured to encompass, in the mounted state, approximately vertically projecting uprights on a frame of the belt lock,
wherein the lengthwise arms are connected by the cross arm, and
wherein the second adapter region is located on the cross arm and has at least one fastener configured to fasten to the rocker.

13. The switching adapter as claimed in the claim 12, wherein the second adapter region is articulated to the first adapter region.

14. The switching adapter as claimed in claim 12, wherein the lengthwise arms are articulated to the cross arm.

15. The switching adapter as claimed in claim 12, comprising a film hinge,
wherein at least one of the second adapter region and the lengthwise arms are coupled to the cross arm via the film hinge.

16. The switching adapter as claimed in claim 12, wherein the at least one fastener of the second adapter region comprises at least one hook configured to be routed through a respective hole in the rocker and locked to the rocker.

17. The switching adapter as claimed in claim 16, wherein the first and second switching parts comprise at least one of a Reed switch, an inductive switch, and a capacitive switch.

18. The switching adapter as claimed in claim 12, wherein one of the lengthwise arms has a receiver for a Hall sensor,
wherein the second adapter region includes a holding device for a field magnet, and
wherein the receiver is arranged proximate to the holding device for the field magnet such that the sensor is configured to detect the field magnet when the sensor is in the receiver and when the field magnet is in the holding device.

19. The switching adapter as claimed in claim 12, comprising:
a first conductor potted in one of the lengthwise arms, the first conductor having a first touch contact head on an end of the first conductor, the first touch contact head being exposed outside the monolithic plastic part; and
a second conductor potted in the second adapter region, the second conductor having a second touch contact head on an end of the first conductor, the second touch contact head being exposed outside the monolithic plastic part.

20. A belt lock, comprising:
a frame;
a switching adapter mounted in the belt lock, the switching adapter comprising:

a monolithic plastic part having first and second adapter regions which are configured to move relative to one another;

a first switching part arranged on the first adapter region; and a second switching part arranged on the second adapter region, the second switching part being configured to move relative to the first switching part;

a locking mechanism including a movable component, the movable component being configured to switch between a locking position and an unlocking position; and a state sensor that includes the first switching part and the second switching part, is integrated in the switching adapter, and is configured to monitor the position of the movable component, wherein the first adapter region is mounted on the frame of the belt lock, wherein the second adapter region is in contact with the movable component of the locking mechanism, wherein the movable component is configured to assume a first end position in a locking process of the locking mechanism and assume a second end position in an unlocking process of the locking mechanism, and wherein the movable component comprises a rocker which forms a locking body.

21. The belt lock as claimed in claim 20, wherein the movable component is configured to move relative to the frame, wherein, when the movable component is in the locking position, the movable part is configured to be locked with a belt buckle of a safety belt, wherein, when the movable component is in the unlocking position, the movable component is configured to be unlocked from the belt buckle of the safety belt, and wherein the switching adapter and the movable component are dynamically connected such that the switching state of the switching adapter and the location of the movable component can be changed only at the same time.

22. The belt lock as claimed in claim 20, wherein the first and second switching parts are configured for proximity switching.

23. The belt lock as claimed in claim 22, comprising:

an electrical connection to the first switching part, wherein the second switching part is independent of electrical connection.

24. The belt lock as claimed in claim 22, wherein the proximity switching is implemented by at least one of a Reed switch, a inductive switch, and a capacitive switch.

25. The belt lock as claimed in claim 20, wherein the switching adapter is mounted on a side of the movable component facing away from a belted passenger.

26. The belt lock as claimed in claim 20, wherein the second adapter region is connected positively and/or nonpositively to the movable component of the belt lock.

27. A belt lock, comprising:

a frame;

a switching adapter mounted in the belt lock, the switching adapter comprising:

a monolithic plastic part having first and second adapter regions which are configured to move relative to one another;

a first switching part arranged on the first adapter region; and a second switching part arranged on the second adapter region, the second switching part being configured to move relative to the first switching part;

a locking mechanism including a movable component, the movable component being configured to switch between a locking position and an unlocking position; and a state sensor that includes the first switching part and the second switching part, is integrated in the switching adapter, and is configured to monitor the position of the movable component, wherein the first adapter region is mounted on the frame of the belt lock, and wherein the second adapter region is in contact with the movable component of the locking mechanism, and wherein the first and second switching parts comprise first and second, contact heads, respectively, for a touch contact.

28. The belt lock as claimed in claim 27, wherein the movable component is configured to assume a first end position in a locking process of the locking mechanism and assume a second end position in an unlocking process of the locking mechanism.

29. The belt lock as claimed in claim 28, wherein the movable component is a rocker which forms a locking body.

30. The belt lock as claimed in claim 28, wherein the movable component is a locking body configured to be guided translationally in one of a guide, a part which moves in association with the locking body, and a mounting spring for acting on the locking body.

* * * * *